US009716592B1

(12) United States Patent
Mandal et al.

(10) Patent No.: US 9,716,592 B1
(45) Date of Patent: Jul. 25, 2017

(54) TRAFFIC DISTRIBUTION OVER MULTIPLE PATHS IN A NETWORK WHILE MAINTAINING FLOW AFFINITY

(75) Inventors: Subhasree Mandal, San Jose, CA (US); Arjun Singh, Mountain View, CA (US); Ashish Naik, Los Altos, CA (US)

(73) Assignee: Google Inc., Mountain View, CA (US)

( * ) Notice: Subject to any disclaimer, the term of this patent is extended or adjusted under 35 U.S.C. 154(b) by 905 days.

(21) Appl. No.: 13/157,925

(22) Filed: Jun. 10, 2011

(51) Int. Cl.
*H04L 9/32* (2006.01)
*H04L 29/08* (2006.01)

(52) U.S. Cl.
CPC .......... *H04L 9/3223* (2013.01); *H04L 9/3242* (2013.01); *H04L 67/1023* (2013.01)

(58) Field of Classification Search
CPC ......... H04L 9/08; H04L 45/60; H04L 9/0643; H04L 9/3223; H04L 29/08234; H04L 67/1023; H04L 9/3242; H04L 67/1065; H04W 12/04
See application file for complete search history.

(56) References Cited

U.S. PATENT DOCUMENTS

| | | | |
|---|---|---|---|
| 6,266,706 B1 | 7/2001 | Brodnik et al. | |
| 6,347,078 B1 | 2/2002 | Narvaez-Guarnieri et al. | |
| 6,385,649 B1 | 5/2002 | Draves et al. | |
| 6,567,382 B1 | 5/2003 | Cox | |
| 6,665,297 B1 | 12/2003 | Hariguchi et al. | |
| 6,721,800 B1 | 4/2004 | Basso et al. | |
| 6,754,662 B1 | 6/2004 | Li | |
| 6,778,532 B1 | 8/2004 | Akahane et al. | |
| 6,956,858 B2 | 10/2005 | Hariguchi et al. | |
| 7,190,696 B1 | 3/2007 | Manur et al. | |
| 7,319,695 B1 | 1/2008 | Agarwal et al. | |
| 2002/0176363 A1* | 11/2002 | Durinovic-Johri | ..... H04L 45/00 370/237 |
| 2003/0152084 A1* | 8/2003 | Lee | ........................ G06F 9/3885 370/395.21 |
| 2005/0041590 A1 | 2/2005 | Olakangil et al. | |
| 2005/0111433 A1* | 5/2005 | Stewart | ................. H04L 49/253 370/351 |

(Continued)

OTHER PUBLICATIONS

Traw et al., "Striping Within the Network Subsystem", IEEE Network, pp. 22-32(1995).

*Primary Examiner* — Andrew Chriss
*Assistant Examiner* — Salvador E Rivas
(74) *Attorney, Agent, or Firm* — McDermott Will & Emery LLP

(57) ABSTRACT

System and methods for efficiently distributing data packets in a multi-path network while maintaining flow affinity are provided. In one aspect, a system and method includes calculating hash values for distributing different flows, or sets of flows, of data packets received at a routing device. The hash value is calculated not only using information in the data packets, but also based on additional information that is determined based on an N-bit derived from the data packets. In some cases, calculating a hash value based on the additional information increases the entropy of the hashing function, thus enabling a routing device to distribute different flows of data packets over a greater number of network paths. Each routing device can derive a different, and randomly generated N-bit key while maintaining flow affinity for each received data packet in a given flow of data packets.

17 Claims, 9 Drawing Sheets

(56) References Cited

U.S. PATENT DOCUMENTS

| | | | |
|---|---|---|---|
| 2006/0002386 A1* | 1/2006 | Yik | H04L 49/3063 370/389 |
| 2006/0122989 A1* | 6/2006 | Kurupati | G06F 17/30595 |
| 2006/0133282 A1 | 6/2006 | Ramasamy | |
| 2006/0221930 A1* | 10/2006 | Sweeney | H04L 45/00 370/351 |
| 2006/0291392 A1 | 12/2006 | Alicherry et al. | |
| 2008/0008178 A1 | 1/2008 | Tychon et al. | |
| 2008/0013552 A1 | 1/2008 | Wright et al. | |
| 2008/0181103 A1* | 7/2008 | Davies | H04L 47/125 370/230 |
| 2008/0247389 A1* | 10/2008 | Horn | H04L 47/10 370/389 |
| 2011/0267947 A1* | 11/2011 | Dhar | H04L 47/125 370/235 |

* cited by examiner

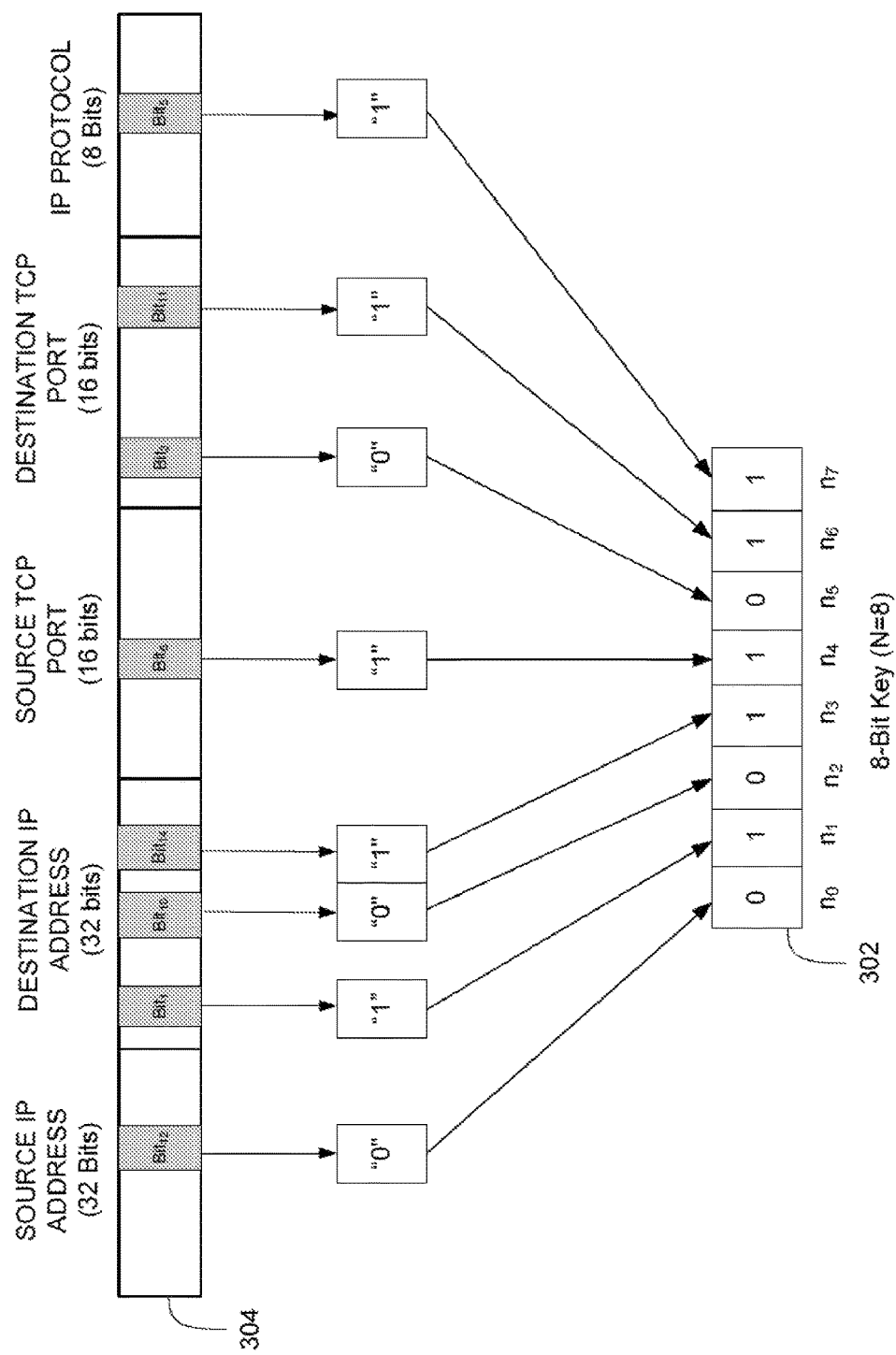

| N-BIT KEY (N=8) | TAG FIELD$_1$ | TAG FIELD$_2$ | TAG FIELD$_M$ |
|---|---|---|---|
| 00000000 | VALUE$_0$ | VALUE$_0$ | VALUE$_0$ |
| 00000001 | VALUE$_1$ | VALUE$_1$ | VALUE$_1$ |
| 00000010 | VALUE$_2$ | VALUE$_2$ | VALUE$_2$ |
| 00000011 | VALUE$_3$ | VALUE$_3$ | VALUE$_3$ |
| . | . | . | . |
| . | . | . | . |
| 01011101 | VALUE$_{93}$ | VALUE$_{93}$ | VALUE$_{93}$ |
| . | . | . | . |
| . | . | . | . |
| . | . | . | . |
| . | . | . | . |
| 11111110 | VALUE$_{254}$ | VALUE$_{254}$ | VALUE$_{254}$ |
| 11111111 | VALUE$_{255}$ | VALUE$_{255}$ | VALUE$_{255}$ |

Recieve a plurality of data packets, each of the received data packets including one or more fields of information for routing that data packet
902

↓

Generate an N-bit key for each of the received data packets by selecting one or more bits from the one or more fields of information in each respective data packet
904

↓

Select one or more tag fields for each of the received of data packets based on the generated N-bit key
906

↓

Compute a hash value for each of the received data packets based on the one or more fields of information and the one or more selected tag fields
908

↓

Select an outgoing port for outputting each of the received data packets over the outgoing port, where the outgoing port is selected for each data packet based on the computed hash value for that respective data packet
910

↓

Output each of the received data packets via the selected outgoing port
912

FIG. 9

TRAFFIC DISTRIBUTION OVER MULTIPLE PATHS IN A NETWORK WHILE MAINTAINING FLOW AFFINITY

TECHNICAL FIELD

The present disclosure generally relates to network communications, and more particularly to systems and methods for efficiently distributing data packets over multiple paths in a computer network.

BACKGROUND

Networking devices are used in packet based networks for interconnecting and enabling communication between hosts devices located at different nodes of the network. A packet based network can have many intervening networking devices located at intermediate nodes of the network, and data packets that are transmitted by a source device or host at one node of the network can traverse many networking devices or "hops" until the data packets reach an intended destination device or host located at another node of the network.

SUMMARY

Aspects of this disclosure are employed for efficiently distributing data packets over multiple paths in networks having a topology including many interconnected networking devices.

In one aspect, a method for routing data packets in a network of interconnected networking devices is provided. The method includes receiving a plurality of data packets at one or more input ports of a first networking device, where each of the received data packets including one or more fields of information for routing that data packet. The method includes generating, with a processor, an N-bit key for each of the received data packets by selecting one or more bits from the one or more fields of information in each respective data packet and, selecting, based on the generated N-bit key, one or more tag fields for each of the received of data packets. The method further includes computing a hash value for each of the received data packets based on the one or more fields of information and the one or more selected tag fields and selecting one of a plurality of outgoing ports of the first networking device for routing each of the received data packets to a second networking device via the network. The method further includes outputting each of the received data packets to the second networking device via the selected outgoing port, where the selected outgoing port is selected for each data packet based on the computed hash value for that respective data packet.

In another aspect, a system including a plurality of routing devices for an interconnection network is provided. Each routing device of the plurality of routing devices includes one or more input ports adapted for coupling to one or more output ports of other routing devices in the interconnection network, the input ports being configured to receive data packets from the one or more output ports of the other routing devices; a memory for storing information regarding the data packets; and a processor coupled to the one or more input ports and the memory. The processor at each routing device is configured to: receive at the one or more input ports a plurality of data packets, each of the received data packets including one or more fields of information for routing each received data packet; generate an N-bit key for each of the received data packets by selecting one or more bits from the one or more fields of information in each respective data packet; select based on the generated N-bit key, one or more tag fields for the received data packets; compute a hash value for each of the received data packets based on the one or more fields of information and the one or more selected tag fields; select one or more output ports for routing one or more of the received data packets to the one or more input ports of a downstream routing device, the one or more output ports being selected for each received data packet based on the computed hash value for that respective data packet; and route one or more of the received data packets via the selected one or more output ports over the interconnection network to the downstream routing device.

In a yet another aspect, a computer-readable recording medium having instructions stored thereon is provided, where the instructions, when executed by a processor, cause the processor to perform the operations of: receiving a plurality of data packets over a network, each of the received data packets including one or more fields of information for routing each data packet further into the network; generating, an N-bit key for each of the received data packets by selecting one or more bits from the one or more fields of information in each respective data packet; selecting, based on the generated N-bit key, one or more tag fields for the received data packets; computing a hash value for each of the received data packets based on the one or more fields of information and the one or more selected tag fields; selecting a downstream networking device from a plurality of networking devices for each of the received data packets, the downstream networking device for each received data packet being selected based on the computed hash value for each respective data packet; and routing each of the received data packets to the selected downstream networking device over the network.

DESCRIPTION OF THE DRAWINGS

FIG. 3 illustrates an example process for deriving an N-bit key for one or more data packets received by a routing device in accordance with one aspect of the disclosure.

FIG. 4 illustrates an example process for selecting one or more tag fields based on the N-bit key derived in FIG. 3.

FIG. 9 illustrates a process flow diagram in accordance with various aspects of the disclosure.

DETAILED DESCRIPTION

Figure 1:
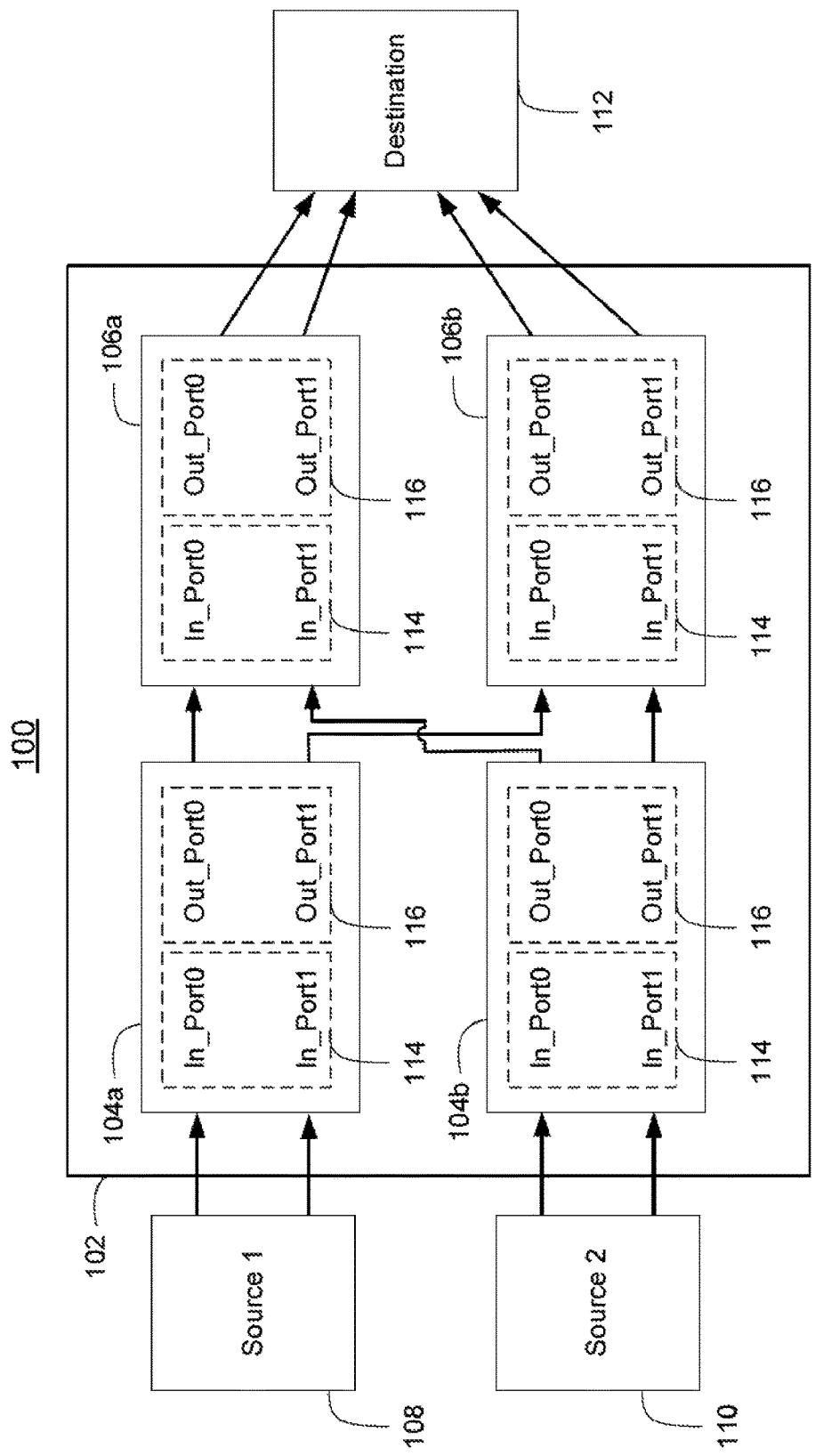
FIG. 1 illustrates an example process flow of a system in accordance with an aspect of the disclosure.

Aspects, features and advantages of this disclosure will be appreciated when considered with reference to the following description of embodiments and accompanying figures. The same reference numbers in different drawings can identify the same or similar elements. Furthermore, the following description is not limiting; the scope of this disclosure is defined by the appended claims and equivalents.

Systems and methods are provided for distributing data packets over different outgoing ports of a networking device in a multi-path network of interconnected networking devices. This is done while maintaining flow affinity for any given flow of data packets.

A flow can be considered an ordered sequence of related data packets whose order needs to be preserved. When flow affinity for data packets is maintained, all data packets belonging to a given flow of data packets are routed along the same path and reach the destination in the ordered sequence in which they were transmitted.

Two data packets from the same flow of data packets have the property that the data in certain selected header fields of the first packet is identical to the data in the same fields in the second packet. Thus, application of the selected header fields to a common hashing function results in the calculation of the same hash value for both packets. In addition, a hashing function can also produce the same hash value when applied to data packets that belong to different flows. Thus, a hashing function can produce a common hash value for not only the same flow of data packets, but in some cases also for data packets that belong to different flows of data packets.

In various aspects, the disclosed systems and methods include calculating hash values for distributing different flows, or sets of flows, of data packets over multiple paths of a network. The hash values(s) are used to select different outgoing ports over which a networking device, such as a router, routes one or more received data packets to other interconnected networking devices further into the network. The hash values are calculated at each networking device by inputting, into a hashing function, routing fields for routing each received data packet.

The routing fields used to calculate the hash value in accordance with various aspects of the disclosure, not only include one or more conventional fields of information used to route data packets, but also include one or more additional tag fields that are determined by the networking device that receives the data packets. In various aspects, the one or more additional tag fields are determined based upon an N-bit key that is derived from information contained in the data packets. In some cases, selecting outgoing ports for routing the data packets based on the one or more tag fields increases entropy at the receiving networking device. This enables the networking device to output different flows, or sets of flows, of received data packets over different outgoing ports than it would have otherwise. As a result, the networking device can then distribute different flows of data packets over a greater number of paths further into the network, thus decreasing the likelihood that some paths of the network are over utilized while other available paths are under or completely utilized.

FIG. 1 illustrates an example topology of a simplified data packet network 100 for interconnecting a plurality of networking devices. In one aspect, the network 100 can be part of a larger network such as the Internet or an intranet, and can support one or more networking protocols such as the Transmission Control Protocol ("TCP") and the Internet Protocol ("IP") of the Internet protocol suite, to enable TCP/IP packet communications between the various interconnected networking devices of the network 100.

As shown in FIG. 1, the network 100 can include a group 102 of interconnected routing devices 104a, 104b, 106a and 106b for routing or forwarding TCP/IP data packets transmitted by source devices 108, 110 to destination device 112. For purposes of explanation and ease of reference, routing devices 104a and 104b will collectively be referred as "peer routing devices", and succeeding downstream routing devices 106a and 106b will collectively be referred as "next hop routing devices". The routing devices depicted in FIG. 1 can include any device that facilitates data transfer over a network. Examples of such devices include, without limitation, general purpose computers, smartphones, PDAs, media devices and any other networked consumer device. The devices can also include other networking devices such as servers, routers, switches, hubs, etc.

Network 100 can be considered an ECMP network, because the data packets transmitted by source devices 108 and 110 can traverse either of two equal cost paths to reach the destination device 112. For example, data packets transmitted by the source device 108 can either traverse routing devices 104a and 106a to reach the destination device 112, or can traverse routing devices 104a and 106b to reach destination device 112. In either case, there are an equal number of hops (in this example, three) between the source device 108 and the destination device 112. Similarly, data packets transmitted by source device 110 can also traverse either of two equal paths each having three hops to the destination device 110, namely routing device 104b to routing device 106a to destination device 112, or routing device 104b to routing device 106b to the destination device 112.

While only a few interconnected networking devices and only two equal cost paths each having three hops are shown in the simplified network 100 of FIG. 1, this is merely for aiding the reader's comprehension. Thus, various implementations of the multi path network 100 can include a large number of interconnected source, destination and routing devices. As a result, the network 100 can also have any number of paths (equal cost or otherwise) each having any given number of hops between any two interconnected networking devices. In addition, the terms source device and destination device are merely used to illustrate the origin and end destinations of a given flow of data packets. Thus, in some examples, the source and destination devices can themselves be routing devices. In this case, the network 100 can simply represent a portion of a larger network of interconnected networking devices, such as for example, an intranet or the Internet. Finally, while particular aspects are described with respect to ECPM networks, it will be understood that the disclosure is not so limited and can be applied to non-ECMP networks and any networking device that outputs data packets over multiple paths of the network by calculating a hash value based upon information contained in the data packets.

Each of the routing devices 104a, 104b, 106a, and 106b can have a number of input or ingress ports 114 for receiving data packets from one or more preceding network devices over the network. For example, the routing devices 104a, 104b can each have two input ports (in_Port0 and in_Port1) that are interconnected via appropriate physical links (indicated by the arrows) to respective outgoing ports (not shown) of a respective preceding source device 108, 110. Similarly, each of the routing devices 106a and 106b can also have two input ports (in_Port0 and in_Port1), that are each interconnected via appropriate physical links (indicated by the arrows) to an outgoing port of the preceding routing devices 104a and 104b, such that data packets transmitted by the routing devices 104a, 104b can be received at the respective input ports of the routing devices 106a, 106b over the network.

In addition, each of the routing devices 104a, 104b, 106a, and 106b can also have a plurality of output or outgoing ports for forwarding or routing data packets to a next hop networking device over the network. For example, each of the routing devices 104a and 104b can have two output ports 116 (out_Port0, out_Port1), which are each interconnected via appropriate physical links (indicated by the arrows) to respective ingress ports 114 of the next hop routing devices 106a, 106b. Similarly, each of the routing devices 106a and 106b can also have two output ports 116, which are each interconnected via appropriate physical links (indicated by the arrows) to respective ingress ports (not shown) of the next hop destination device 112.

While FIG. 1 shows routing devices having two input and two output ports, this is an example only and the routing devices can have any number of input and output ports that are respectively interconnected, as appropriate, to any number of output and input ports of preceding and succeeding networking devices via appropriate physical links.

In addition to the foregoing description, it can be seen in FIG. 1 that the routing devices 104a, 104b (peer routing devices) and the routing devices 106a, 106b (next hop routing devices) are interconnected in a two-stage Clos formation. This is because each of the peer devices (in the first stage) has one of its outgoing ports 116 interconnected via an appropriate physical link to an input port of each of the equal cost next hop routing devices (in the second stage). As a result, each of the peer routing devices 104a and 104b has a choice to route data packets that are received at an input port of the peer routing device to either one of the equal cost, next hop routing devices 106a or 106b.

While a two-stage Clos formation is shown in FIG. 1 for ease of understanding, the network can have any number of stages that include routing devices interconnected in a Clos formation. For example, two additional equal cost next hop routing devices (not shown) can be added to the network 100 between the next hop routing devices 106a and 106b and destination device 112. In this case, the additional equal cost next hop routing devices can also have two input and output ports, where each of the output ports of the additional devices are interconnected via an appropriate physical link to respective input ports of the destination device, and where the input ports of the additional devices are interconnected in a Clos formation to the output ports of the routing devices 106a and 106b, thus creating a three-stage Clos formation of interconnected routing devices. In accordance with this aspect, the number of equal cost paths between each of the source devices and the destination devices now increases to four equal cost paths, and the number of hops that the data packets will traverse from the source devices to the destination device in each of the equal cost paths also increases by one hop to a total of four hops.

In Equal Cost Multi Path ("ECMP") networks, routing devices typically use a hashing function to choose a particular equal cost next hop device out of several equal cost next hop devices to which a flow of data packets will be routed. For a given flow of data packets (an ordered sequence of related data packets), the hashing function at each routing device is used to compute a hash value for each respective data packet, and the hash value is in turn used as a lookup index in a routing (or hashing) table to determine an outgoing port over which a particular flow of data packets will be forwarded to the selected next hop device.

Because different flows of data packets can result in a common hash value when applied to a single hashing function, and given that a limited number of uncorrelated hash functions can be provided, this can limit efficient distribution of flows of data packets over multiple paths in a large network. Furthermore, as multiple routers that use the same hashing function can be connected in series to one another, it is possible that a downstream router receives biased data packets from the upstream router such that the data packets received by the downstream router only hash to a subset of all possible values. Such biased distribution of data packets by routers using a common hashing function can reduce the overall capacity of the network to distribute the data packets evenly over available multiple paths of the network. As a result, uneven distribution of data packets flows at one or more intermediate routing devices can cause some paths of the network to saturate earlier than others, while resulting in the underutilization of other available paths of the network.

As discussed above, each of the routing devices can use a routing table to route or forward data packets over multiple paths of the network to a next hop device. When a data packet is received at an input port of a receiving routing device, the receiving routing device can use a hashing function to compute a hash value based on information contained in the data packet. The calculated hash value can then be used as a lookup index in one or more routing tables of the receiving routing device to determine an outgoing port over which the data packet is then forwarded by the receiving device to an appropriate next hop device. In larger networks, the next hop device can be another routing device located closer to the destination device. As explained above, due to the limitations in the number of distinct hashing functions that are available, the same hashing function can be used in both the peer and the next hop routing devices to ultimately route data packets over the network to the destination device.

Accordingly, in the example illustrated in FIG. 1, each of the routing devices 104a, 104b, 106a and 106b can receive data packets transmitted by a source device and use a routing table to ultimately route or forward the received data packets to the destination device over the network. Further, each routing device can calculate a hash value using the same hashing function implemented in each routing device. For example, the peer routing devices 104a, 104b can implement a hashing function that is the same hashing function that is implemented in one or more of the next hop routing devices 106a, 106b.

Figure 2A:
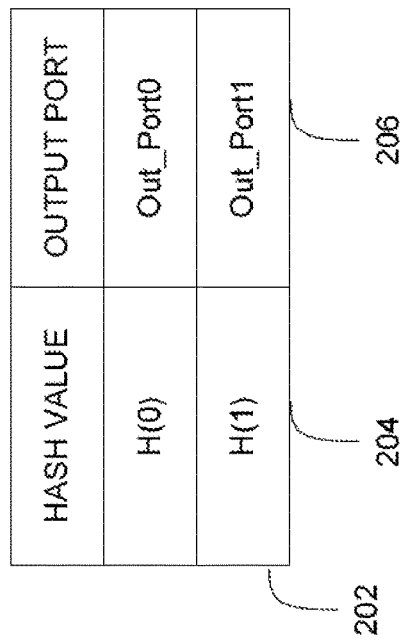
FIG. 2A illustrates an example of data packet fields of a data packet received at one or more routing devices in accordance with the process flow depicted in FIG. 1.

FIG. 2A illustrates an example routing table 202 that can respectively be provided in each of the routing devices 104a, 104b, 106b, and 106b in the network 100 of FIG. 1. As seen in FIG. 2A, routing table 202 includes a list of hash values 204 that are associated with outgoing ports 206 over which data packets can be forwarded or routed by the respective routing device to an appropriate equal cost next hop device further into the network. The list of hash values 204 includes distinct hash values (e.g., H(0), H(1)), which can be calculated using the same hashing function "H( )" (not shown) at each of the routing devices 104a, 104b, 106b, and 106b.

In general, each routing device 104a, 104b, 106a and 106b in FIG. 1 can use routing table 202 in FIG. 2A to select an outgoing port (e.g., out_Port0 or out_Port1) interconnected to one of a plurality of equal cost next hop devices, as follows. For example, when a flow of data packets is received at an input port of any one of the routing devices 104a, 104b, 106b, and 106b, the receiving routing device can apply the hashing function H( ) provided to thereby to calculate a hash value based on the information contained in one or more fields of each of the received data packets. In one aspect, the one or more fields used to calculate the hash value for a received data packet can include any combination of conventional data packet fields used to route data packets to the next hop device.

Figure 2B:
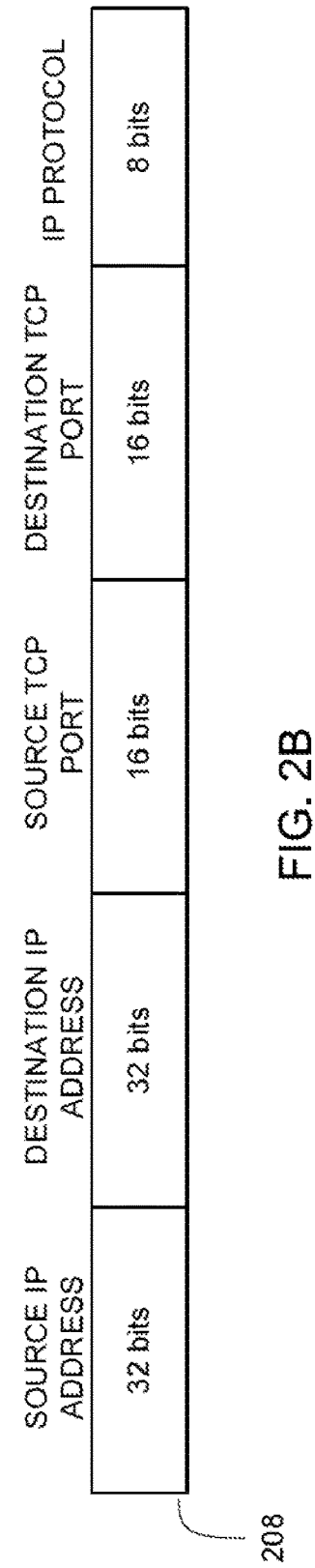
FIG. 2B illustrates an example routing table in accordance with the process flow depicted in FIG. 1.

For example, FIG. 2B illustrates five header fields 208 of a received data packet, one or more which can be input into the hashing function to calculate a hash value of a respective data packet. As seen therein, the five header fields 208 include the data packet's source IP address, destination IP address, source TCP port, destination TCP port, and the IP protocol field. For ease of reference, these five TCP/IP fields will be collectively referred to as the "5-tuple fields". Any combination of the 5-tuple fields, or all five, can be input into the hashing function to calculate a hash value for a received data packet. Depending on the calculated hash value (e.g., H(0) or H(1)), which results from the supplying one or more of such fields to the hashing function, the receiving routing device can then select an appropriate outgoing port associated with the calculated hash value (i.e., out_Port0 or out_Port1) and forward the received data packets over the selected outgoing port to an equal cost next hop device in the network.

The one or more of the routing devices 104a, 104b, 106a and 106b can augment the 5-tuple fields with more one or more additional tag fields to calculate a hash value for each of the received data packets. In some cases, augmenting the 5-tuple fields with additional tag fields when calculating a hash value for one or more flows of received data packets can provide greater entropy at each routing device. As a result, each routing device can be able to distribute different flows (or sets of flows) of data packets over multiple available paths of the network while maintaining flow affinity for any given flow of received data packets. This reduces the likelihood that some paths of the networks are saturated while others are underutilized or unused. Such distribution of data packet traffic over multiple paths of the network can be accomplished without requiring any expensive hardware changes and/or implementation of additional uncorrelated hashing functions in the routing devices.

The determination of one or more tag fields that are used to supplement the 5-tuple fields when calculating the hash value for each of the received data packets is described below. In general, the tag field(s) used to calculate the hash value for each received data packet can be determined based upon an N-bit key that is derived based upon the information contained in the received data packet. In one aspect, for example, the N-bit key for a received data packet can be derived from the information contained in one or more of the 5-tuple fields of the received data packet. In another aspect, the N-bit key can be derived from one or more bits in each of the 5-tuple fields of the received data packet. An example process for deriving an N-bit key for each received data packet is illustrated in FIG. 3 and described in further detail below.

As shown in the example of FIG. 3, an 8-bit key 302 (N=8) that includes bits $n_0$-$n_7$ can be derived from the value of selected bits in each of the 5-tuple fields 304 of a received data packet. For example, the value of bit n0 of the 8-bit key 302 can be derived from a single selected bit (e.g., $Bit_{12}$) in the 32-bit source IP address field of the received data packet. The values of bits $n_1$-$n_3$ of the 8-bit key 302 can be derived from three selected bits (e.g., $Bit_1$, $Bit_{10}$, and $Bit_{14}$) in the destination IP address field of the received data packet. The value of bit $n_4$ of the 8-bit key 302 can be derived from a single selected bit (e.g., $Bit_6$) in the source TCP port field of the received data packet. Further, the values of bits $n_5$-$n_6$ of the 8-bit key can be derived from two selected bits (e.g., $Bit_2$ and $Bit_{11}$) in the destination TCP port field of the received data packet. Finally, the value of the last bit $n_7$ of the 8-bit can be derived from a single selected bit (e.g., $Bit_5$) in the IP protocol field of the received data packet. In this manner, the 8-bit key 302, having an example value of "01011011", can be derived for the received data packet based upon the values contained in one or more selected bits in the 5-tuple fields of information in the received data packet.

Once the N-bit key for a received data packet is determined, it can be used to determine the value of one or more additional tag fields used to calculate a hash value of the received data packet. In one aspect, the value of the one or more additional tag fields can be determined using a lookup in a table that maps values of the N-bit key to values of the one or more tag fields. An example of a table for mapping the value of the 8-bit key derived in the example above to the value of one or more tag fields is shown in FIG. 4.

As shown in FIG. 4, each routing device can include a table 400 that associates all possible values of the 8-bit key with values of one or more tag fields. Thus, in one aspect, the table 400 can contain 256 (2^8) possible values for a binary 8-bit key (N=8), where each possible value of the 8-bit key can be associated with predetermined values for one or more tag fields (e.g., Tag $Field_1$, Tag $Field_1$, Tag $Field_M$, etc.) that can be used to supplement the data in the 5-tuple fields in calculating a hash value for each received data packet. Continuing the example above, a routing device that receives a data packet can thus perform a lookup in the table 400 for a particular value of the 8-bit key derived from the selected bits of the 5-tuple fields of the received data packet (in this case "01011011"), and select values for each of the tag fields associated with the derived 8-bit key (as indicated by the circles).

Figure 5:
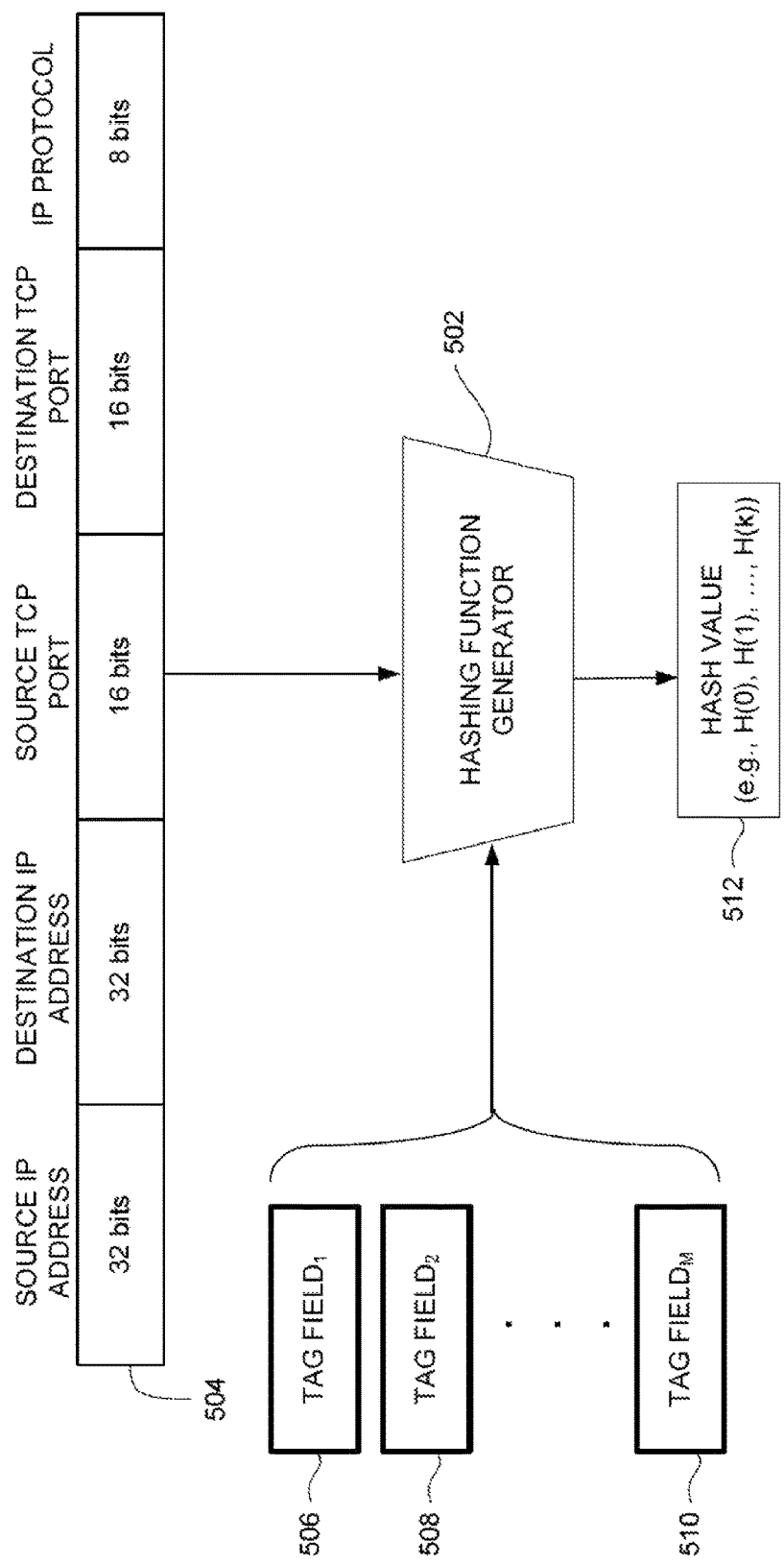
FIG. 5 illustrates an example process for calculating a hash value in a routing device in accordance with aspects of the disclosure.

Once the values for the one or more tag fields are determined, the selected tag fields can be used in combination with one or more of the 5-tuple fields to calculate a hash value for each received data packet. This is illustrated in FIG. 5, which depicts a hashing function generator 502 for determining a hash value for a received data packet based on one or more inputs. The inputs to the hashing function generator can include one or more of the 5-tuple fields 504 of the received data packet. As further illustrated, the inputs to the hashing function generator also include one or more tag field values (e.g, 506, 508, and 510) determined based on the value of the N-bit key derived from the selected bits of the 5-tuple fields 504 as described in detail above. Along with the values in the 5-tuple fields 504, the tag field values 506, 508, and 510 can be used as additional or supplementary inputs to the hashing function 502 to calculate a hash value 510 (e.g., H(0), H(1), H(k), etc.) for the received data packet. The calculated hash value 510 can then be used be used to perform a lookup in a routing table to select an outgoing port over which the received data packet can then be routed or forwarded by the receiving routing device to the next hop device further into the network.

As discussed above, an N-bit key can be calculated for each received data packet based on selected bits in the 5-tuple fields of each respective data packet. Thus, for data packets that belong to the same flow (having the same values in each of the respective 5-tuple fields), the calculated value of the N-bit key based on the same selected bits in each of the 5-tuple fields for a particular flow of data packets will also be the same. As the same N-bit key can be used to determine one or more additional tag fields for a given flow of data packets, the selected values of each of the one or more tag fields will also be the same. Augmenting the 5-tuple fields with the same values of the one or more tag fields results in the generation of the same hash value for each received packet in a given flow of data packets. This ultimately results in the selection of the same outgoing port for each data packet belonging to the same flow of data packets, thus ensuring flow affinity.

In contrast, different flows of data packets can, in some cases, result in a derivation of a different value of the N-bit key using the same selected bits in the 5-tuple fields for different flows of data packets. As the derived N-bit keys for any two different flows can be different (because the values of the selected bits in the 5-tuple fields for different flows can be different), this can result in the selection of different values for the one or more tag fields for different flows of data packets. In addition, the size of the N-bit key (the selected number of bits in the 5-tuple fields) can determine the likelihood of deriving the same value of the N-bit key for different flows of data packets. While deriving larger N-bit keys will result in a greater likelihood that different flows of data packet result in different values of the N-bit key, it can not always be desirable to have very large number of bits in the N-bit key, because it can make mapping the value of the N-bit key to the one or more tag fields more resource intensive and expensive. Thus, the size of the N-bit key ranging between a 4-bit key to an 8-bit key can be sufficient, although other sizes can also be employed.

As explained below, augmenting the 5-tuple fields with one or more different tag field(s) when calculating the hash values for different flows of data packets can prevent the generation of the same hash value for the different flows (or sets of flows) of received data packets. Because the different hash values can be associated with different outgoing ports of the routing device, the routing device can thus distribute or route different flows (or sets of flows) over different available paths of the network while maintaining flow affinity for any given flow of data packets.

Figure 6:
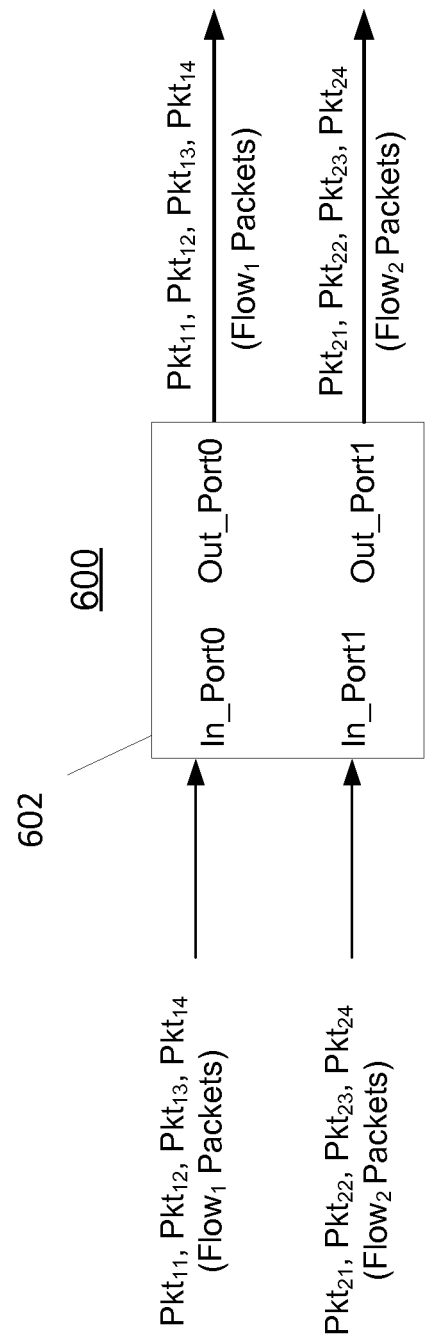
FIG. 6-7 illustrate an example of a comparative distribution of data packets in a routing device in accordance with aspects of the disclosure.
Figure 7:
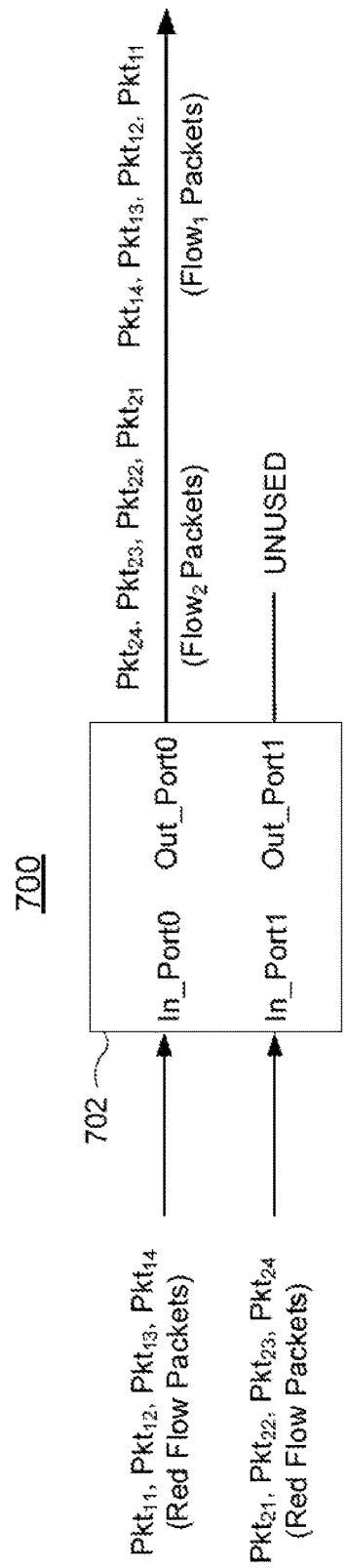

Referring now to FIGS. 6-7, an example operation in accordance with various aspects of the disclosure is described below. FIG. 6 illustrates an example system 600 for distribution of data packets received at a routing device over multiple paths of a network. System 600 includes a routing device 602 that includes two input ports (in_Port0 and in_Port1) for receiving data packets from one or more preceding interconnected network devices (not shown) over the network. The routing device 602 further includes two equal cost output ports (out_Port0 and out_Port1) for forwarding the data packets received at the input ports to a selected one of one or more equal cost next hop routing devices (not shown) further into the network. The routing device 602 includes a hashing function that is used to calculate a hash value for each received data packet. The hash value is then used to route the data packet over a selected output port based on a routing table as described above.

As seen in FIG. 6, the routing device 602 receives two different flows of data packets (Flow$_1$ data packets and Flow$_2$ data packets) at the input ports of the routing device. As further illustrated, Flow$_1$ data packets are designated as Pkt$_{11}$, Pkt$_{12}$, Pkt$_{13}$ and Pkt$_{14}$. Similarly, Flow$_2$ data packets are designated as Pkt$_{21}$, Pkt$_{22}$, Pkt$_{23}$ and Pkt$_{24}$. All packets in the Flow$_1$ data packets belong to the same flow and thus have the same value in their respective 5-tuple fields. Similarly, all packets in the Flow$_2$ data packets also belong to the same flow of data packets and also have the same values in their respective 5-tuple fields. Further, the Flow$_1$ data packets and the Flow$_2$ data packets are two different flows of data packets, and thus the one or more values of the 5-tuple fields in the Flow$_1$ data packets are different than those in the Flow$_2$ data packets.

In addition to the foregoing, it is assumed for the purposes of this example operation that each received data packet in the two different flows of data packets results in the same hash value (e.g., H(0)) for each received data packet if their respective 5-tuple fields are inputted into the hashing function without applying additional tag fields to the hashing function in the manner described above. When the same resulting hash value is used to select an outgoing port in the routing table, a common outgoing port is selected for both flows of received data packets. This is illustrated in FIG. 7, where it is shown that both the Flow$_1$ data packets and Flow$_2$ data packets are outputted over a single equal cost outgoing port (in this case out_Port0) to the same next hop device further into the network, while the second equal cost outgoing port (i.e., out_Port0), is completely unutilized.

We now return to FIG. 6, which illustrates the example distribution of the received data packets when the 5-tuple fields are supplemented with one or more tag fields in the manner described above. As noted above, augmenting the 5-tuple fields with one or more tag fields can add entropy to the hashing function, thus resulting in the calculation of different hash values (e.g., H(0) for Flow$_1$ data packets and H(1) for Flow$_2$ data packets) for the two different flows of data packets. As a result, and as shown in FIG. 6, the routing device 602 can now efficiently distribute the two received flows of data packets over both equal cost outgoing ports (i.e., out_Port0 and out_Port1), thus reducing the likelihood that any given equal cost outgoing port is saturated while another equal cost outgoing port is under or completely unutilized.

The one or more tag field values can be inputted into the hashing function in several ways. In one aspect, the one or more tag fields can be provided as additional inputs to the hashing function without modifying the data packet contents. However, this can require hardware and/or software changes in the implementation of the hashing function, thus making this a relatively more expensive approach. In addition, some implementations of the hashing function can require the inputs to the hashing function to be provided as part of the data packet itself. Thus, in another aspect, the received data packet can be "tagged" with the determined values of the one or more tag fields. For example, certain predetermined fields in the header portion of the received data packets (e.g., VLAN ID, MAC ID, etc.) can be replaced (or tagged) with the one or more selected tag fields via an Access Control List ("ACL") mechanism supported by the routing device. The information in the tagged data packets can thus be input into the hashing function along with the 5-tuple fields contained in the received data packets. Yet another aspect is to use one or more User Defined Fields (UDF) by selecting one or more random bits in the fields that are otherwise provided as hash inputs in the received data packets.

The values of the one or more tag fields associated with each N-bit key can also be determined in several ways. In one aspect, some or all of the values of the one or more tag fields can be based on the value of the N-bit key. For example, the values of the tag fields associated with each possible value of the N-bit key can be predetermined based on using any number of values of the N-bit key as random seeds in a random function. In another aspect, the values of the one or more tag fields can be completely independent of the values of the N-bit key. For example, the values of the one or more tag fields can be randomly generated without regard to the possible values of the N-bit key. In a yet another aspect, some of the values of the one or more tag fields can be randomly generated while others can have a fixed predetermined value.

In addition to the foregoing, the size of each of the one or more tag fields can be any size the hardware allows as extra input in addition to the normal inputs to the hashing function. In one aspect, for example, the size of the one or more tag fields can be based upon the size of certain fields in the data packet that are tagged with the one or more tag fields for use as inputs to the hashing function. In another aspect, the size of the one or more tag fields can be based on one or more UDF fields in the tagged data packet. In a still another aspect, the value of one or more N-bit keys can itself be used as the value of one or more tag fields in a tagged data packet.

Each routing device in the network can independently derive an N-bit key for the received data packets based on a different combination of the selected bits in the 5-tuple fields in the respective data packet received at a particular routing device. For example, each routing device can select different bits of information from each of the 5-tuple fields than the ones selected by the other routing devices in a predetermined manner. In another aspect, a routing device can also randomly select different bits of information from each of the 5-tuple fields to generate a random N-bit key.

In addition, the size of the N-bit key derived by a receiving routing device can be the same or different than the size of the N-bit key in another receiving routing device. In a particular aspect, the selection of bits of the 5-tuple fields comprising the N-bit key can be randomly determined by each next hop routing device. For example, with regard to FIG. 1, the first stage peer routing devices can each derive an N-bit key from the same bits of information in the 5-tuple fields of the received data packets. The peer routing devices can then distribute or route the received data packets to the next hop routing devices 106a, 106b. In turn, the next hop routing devices 106a, 106b, can receive the data packets from the peer routing devices 104a, 104b, and derive a N-bit key by randomly selecting different bits of information in the 5-tuple fields of the received data packets. In some circumstances, selecting different of information in the 5-tuple fields of the received data packets at each stage of the network 100 can further increase the entropy of the network, while allowing each of the next hop routing devices in the network 100 to use the same hashing function as the one implemented in the preceding routing devices.

In a yet another embodiment, a downstream routing device can select an outgoing port for routing data packets based on the information contained in the tag fields determined by the preceding or upstream routing device. In accordance with this embodiment, an upstream routing device can conventionally route tagged data packets to the downstream routing device, where the tagged data packets can include one or more tag fields selected by the upstream networking device in the manner described above. The downstream routing device can receive the tagged data packets and determine a hash value for the tagged data packets by applying the data contained in the tagged fields to a hashing function. The downstream routing device can then select an outgoing port based on the calculated hash value and route the received data packets to another succeeding networking device in the manner described above. In addition, the downstream routing device can also replace the tagged data fields with different tag fields prior to routing the data packets over the selected outgoing port, to enable yet other downstream networking devices to efficiently distribute the data packets further into the network in a similar manner.

Figure 8:
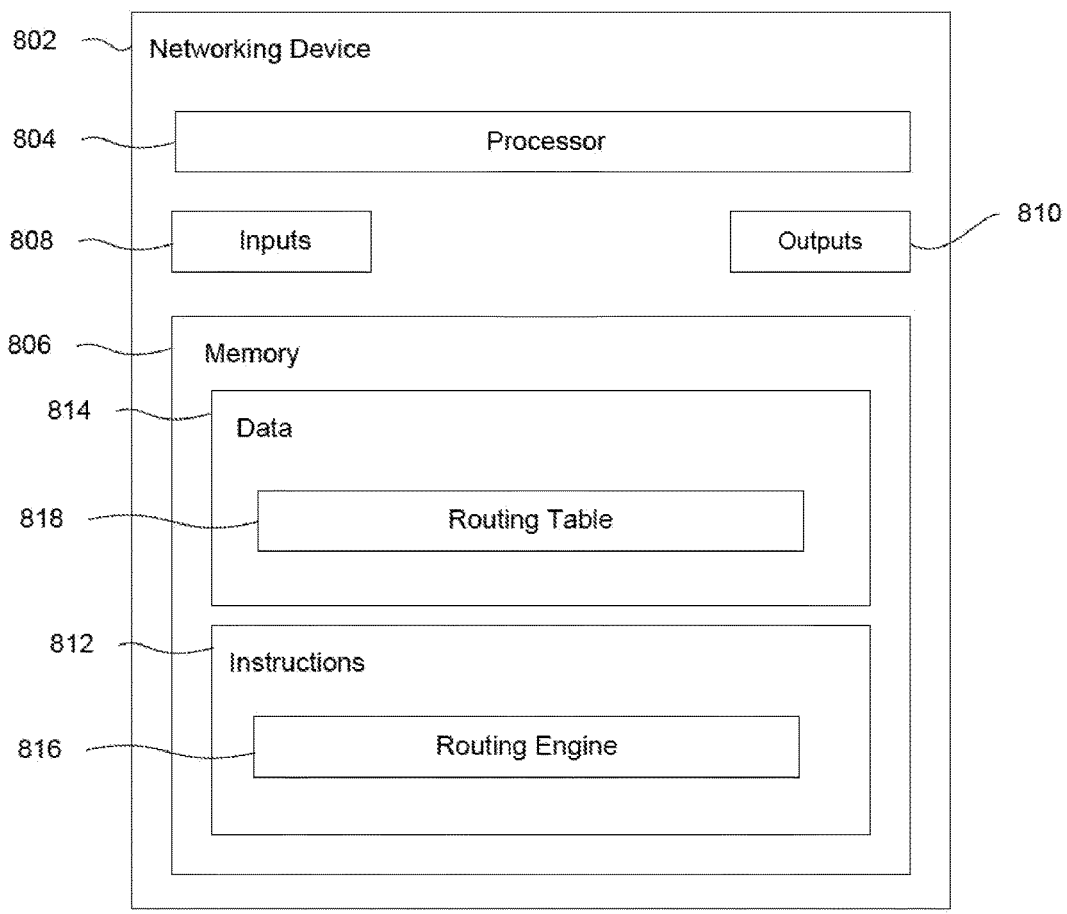
FIG. 8 illustrates an example of a computing device in accordance with aspects of the disclosure.

FIG. 8 illustrates an example of a networking device 802 in accordance with various aspects of the disclosure. As shown, networking device 802 contains a processor 804, memory 806, and various other components typically present in computing devices, such as inputs 808 and outputs 810 that enable a user or another device to interact with the networking device 802.

In one embodiment, the networking device 802 can be a general purpose computer such as a desktop or laptop computer, or any network enabled consumer device such as a smartphone, tablet PC or a PDA. In other embodiments, networking device 802 can be a server or a dedicated routing device, such as a network router, capable of processing instructions and transmitting data to and from humans and to other devices, including other routers, network computers or servers, PDAs with modems, Internet-capable wireless phones, notebooks and tablet PCs in accordance with various aspects of the disclosure described above.

The inputs 808 can include a mouse and keyboard, and can also include other means for inputting information into the networking device, such as, for example, one or more interconnected input or ingress ports that can be used by the networking device 802 to receive information from other networking devices over a network.

The outputs 810 can include a display device (e.g., a monitor), touch screen, audio device (e.g., speakers), network interface (e.g., a modem), or any other device capable of displaying or transmitting information from the networking device 802. In addition, the outputs 810 can also include one or more interconnected output or outgoing ports that can be used by the networking device 802 to transmit information to other interconnected networking devices over the network.

The processor 804 can comprise a general purpose device such as a CPU that is capable of processing instructions for execution within the system. Alternatively, the processor can be a dedicated controller for executing a program of instructions, such as an application specific integrated circuit ("ASIC"), a field programmable gate array ("FPGA"), complex programmable logic devices ("CPLD") or the like.

The memory 806 can store information accessible by the processor 804, including instructions 812 that can be executed by the processor, and data 814 that can be received, manipulated, or stored by the processor 804. In this regard, the memory 806 can be any type of computer-readable memory capable of storing information accessible by the processor, such as a hard-drive, memory card, ROM, RAM, DVD, CD-ROM, write-capable memory, read-only memories, etc.

The instructions 812 can comprise any set of instructions to be executed directly (such as machine code) or indirectly (such as scripts) by the processor 804. In that regard, the terms "instructions," "steps", "programs", and "applications" can be used interchangeably herein. The instructions can be stored in object code form for direct processing by the processor, or in any other computer language including scripts or collections of independent source code modules that are interpreted on demand or compiled in advance.

The data 814 can be retrieved, stored or modified by the processor 804 in accordance with the instructions 812. The data 814 can be stored as a collection of data. Moreover, the data 814 can comprise any information sufficient to identify the relevant information, such as descriptive text, proprietary codes, pointers, references to data stored in other memories (including other network locations) or information which is used by a function to calculate the relevant data. In one aspect, the data 814 can include one or more data packets that are received at the input ports of the computing device over the network Although the processor and memory are functionally illustrated in FIG. 8 as being within the same block, the processor and memory can actually comprise multiple processors and memories that can or cannot be stored within the same physical housing. For example, some of the instructions and data can be stored on removable CD-ROM and others within a read-only computer chip. Some or all of the instructions and data can be stored in a location physically remote from, yet still accessible by, the processor. Similarly, the processor can actually comprise a collection of processors, which can or cannot operate in parallel.

The networking device 802 can be capable of direct and indirect communication with one or more other networking devices via the interconnected input and output ports. Although only a single networking device is depicted, a system consistent with this disclosure can include a large number of networked computers and several servers to which the various computing devices can be interconnected, with each different computing device being at a different node of the network.

The network, and intervening nodes, can comprise various configurations and protocols including the Internet, intranets, virtual private networks, wide area networks, local networks, private networks using communication protocols proprietary to one or more companies, Ethernet, WiFi and HTTP. In addition, such communication can be facilitated by any device or component capable of transmitting data to and from other computers, such as modems (e.g., dial-up or cable), networks cards and wireless interfaces.

In one aspect, memory 806 can include routing engine 816 (which can be implemented using hardware, software or a combination of both) and which can be suitably programmed or designed to operate in accordance with various aspects disclosed herein. In addition, memory 806 can also include a routing table 818, which can contain information that can be used by the routing engine 816 to route or forward data packets that are received at one or more of the input ports of the networking device 802 to other networking devices interconnected to the networking device via one or more output or outgoing ports of the networking device. Both routing engine 816 and routing table 818 can be coupled to and managed by the processor 804.

In one aspect, the routing table 818 can include a list of outgoing ports and hash values associated with each of the outgoing ports, where each hash value can have been calculated by the routing engine 816 based on an appropriate hashing function implemented by the computing device. In accordance with this aspect, when a data packet is received at an input port of the networking device, the routing engine 818 can determine an outgoing port over which the data packet can be routed to an equal cost next hop networking device in the network in the manner described in detail above. In another aspect, the routing engine 816 can also include the functionality of deriving a N-bit key based on a random selection of particular bits in the 5-tuple fields of one or more received data packets in the manner described above.

In one aspect, one or more networking devices 802 can be interconnected in a Clos formation with other networking devices as exemplarily illustrated in FIG. 1. In this regard, each networking device 802 can be, for example, a source device, a destination device, a peer routing device or an equal cost next hop routing device in accordance with various aspects described above.

While the systems and methods disclosed herein can be particularly advantageous where the networking device is a network routing device such as a router, this is not a limitation, and in one aspect the networking device can be an interconnected switching device or chip that is part of a larger switching fabric including a plurality of such chips interconnected in an architecture such as a Clos formation and adapted to operate in accordance with the various aspects described in detail above. In addition, the processes and operations set forth herein can also be implemented directly by one or more hardware-based processors such as sub-processing units in a multiprocessor array.

A process in accordance with various aspects of the disclosure is illustrated as flow diagram 900 in FIG. 9. The following operations do not have to be performed in the precise order described below. Rather, certain operations can occur in a different order or simultaneously.

As shown by block 902, the process begins with the reception of a plurality of data packets, where each of the received data packets includes one or more fields of information for routing or distributing that data packet further into the network. For example, a networking device such as a router can receive the plurality of data packets at one or more input ports of the networking device. In one aspect, the data packets received at the input ports of the networking device can be TCP/IP data packets including 5-tuple fields, where one or more of the 5-tuple fields can be used by the networking device for routing the data packets further into the network. In other aspects, the data packets received at the networking device may belong to the same or different flow of data packets.

In block 904, the process generates an N-bit key for each of the received data packets by selecting one or more bits from the one or more fields of information received in each respective data packet. Continuing the example above, the networking device can generate an N-bit key by selecting one or more bits of information from the one or more of the 5-tuple fields of the TCP/IP data packets received by the networking device. As indicated previously, the bits selected by the networking device can be a set of predetermined bits that are selected by the networking device or a set of bits that are randomly selected by the networking device. Regardless of whether the bits are selected in a predetermined manner or randomly, in once aspect the networking device can generate an N-bit key for each data packet by using the same set of selected bits for each received data packet to maintain flow affinity of the received data packets as explained in above.

In block 906, the N-bit key generated by the process in block 904 is used to select one or more tag fields for each of the received of data packets. In the case above, for example, the networking device can access a table stored internally or externally to the networking device, where the table contains a list of entries that associate each possible value of the generated N-bit key with corresponding values of one or more tag fields.

In block 908, the process computes a hash value for each of the received data packets based on the information contained in the one or more fields of information for routing the data packets and the one or more tag fields that are selected based on the N-bit key generated for the received data packets. Continuing the example above, the networking device may compute hash values for the received data packets by using the 5-tuple fields and the selected tag-fields for each data packet as input into the hashing function implemented by the networking device.

In block 910, the process selects an outgoing port for outputting each of the received data packets, where the outgoing port is selected for each data packet based on the computed hash value for that respective data packet. In the case above, the networking device can select an outgoing port of the networking device to route each of the received data packets further into the network.

In block 912, the process outputs each of the received data packets via the selected outgoing port. For example, the networking device may route each of the received data packets via the selected outgoing port to one or more input ports of an interconnected downstream networking device further into the network.

Although aspects herein have been described with reference to particular embodiments, it is to be understood that these embodiments are merely illustrative of the principles and applications of the present disclosure. It is therefore to be understood that numerous modifications can be made to the illustrative embodiments and that other arrangements can be devised without departing from the spirit and scope of the disclosure.

The invention claimed is:

1. A method for routing data packets in a network of interconnected networking devices, the method comprising:
  receiving, at one or more input ports of a first networking device, a plurality of data packets, each of the received data packets including one or more fields of information for routing that respective data packet;
  generating, with a processor, an N-bit key for each of the received data packets by selecting one or more bits from the one or more fields of information in each respective data packet;
  selecting from a table, one or more tag fields for each of the received data packets, based on the generated N-bit key for the respective data packet;
  replacing bit values of one or more predetermined fields in a header of each of the plurality of data packets with replacement bit values obtained from one or more of the tag fields selected from the table using the N-bit key generated for the respective data packet;
  computing a hash value for each of the received data packets based on the one or more fields of information and the replacement bit values;
  selecting one of a plurality of outgoing ports of the first networking device for routing each of the received data packets to a second networking device via the network, the outgoing port being selected for each data packet based on the computed hash value for that respective data packet; and
  outputting each of the received data packets to the second networking device via the selected outgoing port.

2. The method of claim 1, wherein the received data packets include at least one data packet belonging to a first flow of data packets and at least one data packet belonging to a second flow of data packets.

3. The method of claim 2, wherein the outgoing port selected for the at least one data packet belonging to the first flow of data packets is different than the outgoing port selected for the at least one data packet belonging to the second flow of data packets.

4. The method of claim 1, wherein at least one of the one or more fields of information included in each of the received data packets is selected from the group consisting of a source address field, a destination address field, a source port field, a destination port field, and a protocol field.

5. The method of claim 1, wherein selecting one or more bits from the one or more fields of information in each respective data packet to generate the N-bit key for each data packet further comprises randomly selecting bits from the one or more fields of information in at least one of the received data packets.

6. The method of claim 1, wherein the N-bit key generated for each data packet includes at least one bit selected from one of the fields of information for routing each respective data packet.

7. The method of claim 1, further comprising:
  tagging, at the first networking device, each of the received plurality of data packets with the one or more selected tag fields and routing the tagged data packets to the second networking device;
  receiving the tagged data packets at one or more input ports of the second networking device;
  selecting, based on the data contained in the one or more tag fields in the tagged data packets, one or more outgoing ports of the second networking device; and
  routing the tagged data packets further into the network via the selected one or more outgoing ports of the second networking device.

8. The method of claim 7, wherein routing the tagged data packets further into the network via the selected one or more outgoing ports of the second networking device further comprises modifying the one or more tag fields of the tagged data packets and routing the tagged data packets including the modified one or more tag fields further into the network via the selected one or more outgoing ports.

9. A system including a plurality of routing devices for an interconnection network, each routing device of the plurality of routing devices comprising:
  one or more input ports coupled to one or more output ports of other routing devices in the interconnection network, the input ports being configured to receive data packets from the one or more output ports of the other routing devices;
  memory for storing information regarding the data packets; and
  a processor coupled to the one or more input ports and the memory, the processor being configured to:
    receive at the one or more input ports a plurality of data packets, each of the received data packets including one or more fields of information for routing each the respective data packet;
    generate an N-bit key for each of the received data packets by selecting one or more bits from the one or more fields of information in each respective data packet;
    select from a table, one or more tag fields for each of the received data packets, based on the generated N-bit key for the respective data packet;
    replace bit values of one or more predetermined fields in a header of each of the plurality of data packets with bit values of one or more of the selected tag fields selected from the table based on the N-bit key generated for the respective data packet;
    compute a hash value for each of the received data packets based on the one or more fields of information and the replaced bit values of the one or more predetermined fields in the header of the respective data packet;
    select one or more output ports for routing one or more of the received data packets to the one or more input ports of a downstream routing device, the one or more output ports being selected for each received data packet based on the computed hash value for that respective data packet; and output one or more of the received data packets via the selected one or more output ports over the interconnection network to the downstream routing device.

10. The system of claim 9, wherein the interconnection network is a CLOS interconnection network.

11. The system of claim 9, wherein the interconnection network is an Equal Cost Multiple Path interconnection network.

12. The system of claim 9, wherein the received data packets include data packets belonging to a first flow of data packets and data packets belonging to a second flow of data packets.

13. The system of claim 9, wherein the processor is further configured to select a first outgoing port for the first flow of data packets and a second outgoing port for the second flow of data packets.

14. The system of claim 9, wherein at least one of the one or more fields of information included in each of the received data packets is selected from the group consisting of a source address field, a destination address field, a source port field, a destination port field, and a protocol field.

15. The system of claim 9, wherein the one or more bits selected from the one or more fields of information in each of the received data packets to generate the N-bit key for each data packet further includes bits randomly selected from the one or more fields of information in at least one of the received data packets.

16. A non-transitory computer readable recording medium having instructions stored thereon, the instructions, when executed by a processor, cause the processor to perform the operations of:

receiving a plurality of data packets over a network, each of the received data packets including one or more fields of information for routing the respective data packet further into the network;

generating, an N-bit key for each of the received data packets by selecting one or more bits from the one or more fields of information in the respective data packet;

selecting from a table, one or more tag fields for each of the received data packets, based on the generated N-bit key for the respective data packet;

replacing bit values of one or more predetermined fields in a header of each of the plurality of data packets with bit values of one or more of the selected tag fields selected from the table;

computing a hash value for each of the received data packets based on the one or more fields of information and the replaced bit values of the one or more predetermined fields in the header of each respective data packet;

selecting a downstream networking device from a plurality of networking devices for each of the received data packets, the downstream networking device for each received data packet being selected based on the computed hash value for each respective data packet; and outputting each of the received data packets to the selected downstream networking device over the network.

17. The method of claim 1, wherein selecting one or more tag fields further comprises:

determining which of the one or more tag fields map to the N-bit key in a look-up table.

* * * * *